United States Patent [19]

Weaver et al.

[11] Patent Number: 5,136,312

[45] Date of Patent: Aug. 4, 1992

[54] FLASH ILLUMINATION SYSTEM AND METHOD INCORPORATING INDIRECT REFLECTING SURFACE DETECTION

[75] Inventors: Thomas C. Weaver, Sodus; Richard B. Wheeler, Webster, both of N.Y.

[73] Assignee: Eastman Kodak Company, Rochester, N.Y.

[21] Appl. No.: 754,242

[22] Filed: Aug. 26, 1991

Related U.S. Application Data

[63] Continuation of Ser. No. 457,081, Dec. 26, 1989, abandoned.

[51] Int. Cl.[5] .............................................. G03B 15/03
[52] U.S. Cl. ................................. 354/132; 354/149.1
[58] Field of Search ................. 354/132, 127.13, 145.1, 354/149.1

[56] References Cited

U.S. PATENT DOCUMENTS

| | | | |
|---|---|---|---|
| 4,242,616 | 12/1980 | Takematsu | 354/132 |
| 4,384,238 | 5/1983 | Greenwald et al. | |
| 4,415,247 | 11/1983 | Takematsu | 354/132 |

FOREIGN PATENT DOCUMENTS

| | | |
|---|---|---|
| 63-136442 | 12/1989 | Japan . |
| 63-136443 | 12/1989 | Japan . |

*Primary Examiner*—Russell E. Adams
*Attorney, Agent, or Firm*—Martin G. Linihan

[57] ABSTRACT

A flash system and method for providing artificial illumination for image capture wherein a source of flash illumination operates selectively in a first mode for projecting light in a first direction toward an indirect reflecting surface to illuminate a subject indirectly and in a second mode for projecting light in a second direction to illuminate the subject directly, electromagnetic radiation reflected directly from the indirect reflecting surface is sensed directly to provide a signal containing information about the indirect reflecting surface, and the information contained in the signal is utilized to control the selective projection of light in the first and second directions to control the quantities of indirect and direct light which illuminate the subject. In one aspect, electromagnetic radiation such as infrared radiation is transmitted to the indirect reflecting surface in a manner such that a portion of the radiation is reflected from the surface back to the flash system where it is detected to provide a signal containing information relating to the distance between the surface and a given location in the flash system. In another aspect, light reflected directly from the indirect reflecting surface during operation of the source in the first or indirect flash mode is received directly by a sensor in the system to provide a signal indicating the presence of the indirect reflecting surface.

30 Claims, 11 Drawing Sheets

ND METHOD
FLASH ILLUMINATION SYSTEM AND METHOD INCORPORATING INDIRECT REFLECTING SURFACE DETECTION

This application is a continuation of application Ser. No. 07/457,081, filed Dec. 26, 1989, now abandoned.

BACKGROUND OF THE INVENTION

This invention relates to the art of artificial illumination for image capture, and more particularly to a new and improved system and method for detecting indirect reflecting surfaces in flash illumination.

The use of auxiliary sources of illumination such as electronic flash is well established. In addition, the further refinement of such devices to provide indirect flash is also well known. Indirect flash illumination eliminates many of the undesirable characteristics of direct lighting such as: harsh shadows, specular reflections, red-eye, and high contrast or loss of tonal detail. Unfortunately indirect flash also requires much more energy than direct flash illumination. Therefore, it is desirable to combine flash systems which contain both direct and indirect flash capability in a single unit.

Circuits have been developed which control the total energy output of direct and indirect flashtubes by a photodetector. The ratio of indirect to direct illumination is fixed, e.g. 75:25, but the total energy output is regulated. The photodetector is positioned such that the axial scene luminance is measured. When a preset signal level is reached, the flash output is discontinued or quenched. This type of scene reflectance based quenching system suffers from several deficiencies. First, the accuracy of exposure control is directly related to the reflectance of the subjects being photographed. If a highly reflective object, e.g. a bride in a white gown, is being photographed, much of the flash illumination will return to the flash sensor, and the light output will be quenched, that is less than the total amount of light is delivered to the subject. A less reflective object, e.g. groom in dark suit, positioned the same distance from the camera will return less light to the sensor, and the light output will not be quenched. As a result, two subjects which should have received equal illumination—located equal distances from the flash source—will actually receive different illumination and the resulting exposures will not be matched. In addition, the proximity of the background surface, e.g. a wall and its reflectance, will also influence the quenching accuracy and add variability to the exposure control process.

A potentially more serious limitation with the aforementioned approach requires that the user predetermine the presence of a suitable indirect reflecting surface, e.g. ceiling, for the indirect flash source, prior to composing and taking the picture. Inexperienced photographers often are not aware of the scene conditions and prefer to take pictures without making any decisions. These users require an automatic method for activating the indirect flash system when a suitable reflecting surface is available.

A method and apparatus for automatically apportioning light from a dual tube, direct-indirect flash system is disclosed in U.S. Pat. No. 4,384,238 issued May 17, 1983 and assigned to the assignee of the present invention. The indirect tube is fired first, after which the intensity of the axial light returning from the scene is evaluated. If the signal is strong, the presence of a ceiling is assumed and additional energy is applied to the indirect flashtube. If the signal is below a specified threshold, the absence of a ceiling is assumed, and the energy is sent to the direct flashtube. When presented with a scene of average reflectance this device will provide automatic selection of indirect flash without user intervention. Unfortunately, scene reflectance variability not only can produce quenching induced exposure errors, but it also can interfere with the detection of a ceiling. For example, if an object of high reflectance is located near the camera, a strong return from the indirect flash will be measured, and the presence of a ceiling will be assumed. If an object of low reflectance is positioned in the same place, the return from the indirect flash will be of lower intensity, and the ceiling will not be detected. This can cause potential indirect flash opportunities to be missed.

It would, therefore, be highly desirable to provide a system and method providing artificial flash illumination for image capture wherein detection of an indirect reflecting surface is automatic so as to not require user intervention and is not influenced by the reflectance of the subject.

SUMMARY OF THE INVENTION

It is, therefore, a primary object of this invention to provide a new and improved system and method of artificial flash illumination for image capture incorporating indirect reflecting surface detection.

It is a more particular object of this invention to provide such a system and method which is automatic thereby eliminating user participation or intervention.

It is a further object of this invention to provide such a system and method which is not influenced by the reflectance of the subject.

It is a further object of this invention to provide such a system and method wherein indirect reflecting surface detection is accomplished with relatively lower power consumption.

It is a further object of this invention to provide such a system and method wherein the actual reflecting efficiency of the indirect reflecting surface is measured.

It is a further object of this invention to provide such a system and method wherein the distance to the indirect reflecting surface is measured to significantly increase the reliability of indirect flash exposure determination.

It is a further object of this invention to provide such a system and method which can be readily combined with known methods of flash exposure control.

It is a further object of this invention to provide such a system and method which is relatively simple in structure and efficient and effective in operation.

The present invention provides a flash system and method for providing artificial illumination for image capture wherein a source of flash illumination operates selectively in a first mode for projecting light in a first direction toward an indirect reflecting surface to illuminate a subject indirectly and in a second mode for projecting light in a second direction to illuminate the subject directly, electromagnetic radiation reflected directly from the indirect reflecting surface is sensed directly to provide a signal containing information about the indirect reflecting surface, and the information contained in the signal is utilized to control the selective projection of light in the first and second directions to control the quantities of indirect and direct light which illuminate the subject. The information contained in the signal can include the presence or absence of the indirect reflecting surface within a predetermined range, the distance between the flash system and the surface, and the efficiency of the indirect reflecting surface. In one aspect of the present invention, electromagnetic radiation such as infrared radiation is transmitted to the indirect reflecting surface in a manner such that a portion of the radiation is reflected from the surface back to the flash system where it is detected to provide a signal containing information relating to the distance between the surface and a given location in the flash system. A control responsive to the signal causes operation of the source of flash illumination in both first and second modes when the indirect reflecting surface is within a predetermined distance and causes operation of the source only in the second or direct flash mode when the indirect reflecting surface is not within the predetermined distance. In another aspect thereof, light reflected directly from the indirect reflecting surface during operation of the source in the first or indirect flash mode is received directly by a sensing means in the system to provide a signal indicating the presence of the indirect reflecting surface. A control responsive to the signal continues operation of the source in the first or indirect flash mode when the signal is received within a predetermined time and terminates operation of the source in the first mode while continuing operation of the source in the second or direct flash mode if the signal is not received within the predetermined time. The source can include separate flash tubes for providing indirect and direct flash light beams, or it can include a single flash tube and controlled means for separating the output of the single tube into separate indirect and direct beams. Detection of the indirect reflecting surface according to the present invention can be employed with various methods of flash exposure control to enhance the effectiveness of those methods.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

Figure 1:
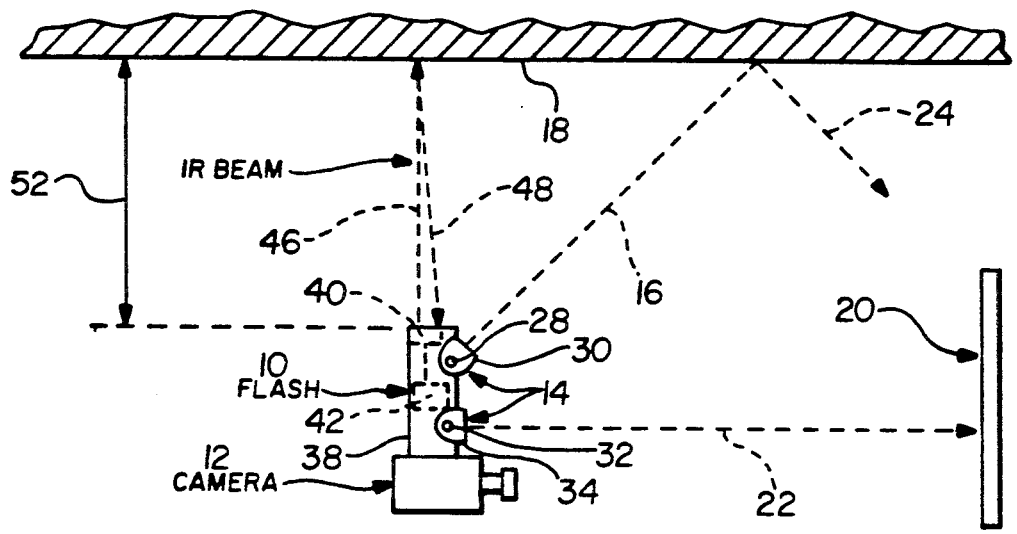
FIG. 1 is a diagrammatic view illustrating a flash system and method of providing artificial illumination for image capture according to one embodiment of the present invention.

Referring now to FIG. 1, there is shown a flash system generally designated 10 for providing artificial illumination for image capture, and in the present illustration system 10 is shown in combination with a conventional camera 12. The system 10 of the present invention includes a source of flash illumination generally designated 14 which operates selectively in a first mode for projecting light in a first direction 16 toward an indirect reflecting surface 18 to illuminate a subject 20 indirectly, and in a second mode for projecting light in a second direction 22 to illuminate the subject 20 directly. Light from source 14 travelling along path 16 is reflected by surface 18 in the direction 24 toward subject 20. Typically, indirect reflecting surface 18 is the ceiling in a room where the subject is being photographed. In the flash system 10 shown in FIG. 1, source 14 comprises separate components for indirect and direct illumination. In particular, a first component includes a flash tube 28 and reflector 30 which are arranged to project a flash light beam toward indirect reflecting surface 18, i.e. upwardly in the arrangement shown in FIG. 1, so that upon reflection from the overhead surface 18, the subject can be illuminated indirectly in a way characteristic of the natural lighting of the sun. A second component includes a flash tube 32 and reflector 34 arranged to project a flash light beam directly at the subject 20 to provide fill-in to soften any dark shadows thereon. The first and second components of source 14 are mounted on a housing 38.

In accordance with the present invention, flash system 10 comprises sensing means 40 utilizing electromagnetic radiation reflected from indirect reflecting surface 18 directly to the sensing means for providing a signal containing information about the indirect reflecting surface 18, and control means 42 for controlling the operation of the source 14 in the two modes as determined by the information in the signal from the sensing means. The sensing means 40 and control means 42 are contained in housing 38, and the sensing means is located so as to receive electromagnetic radiation reflected from surface 18 directly to the sensing means 40, i.e. on a surface of housing 38 disposed toward surface 18 during use of camera 12.

In this embodiment of the present invention, the electromagnetic radiation received by the sensing means is infrared radiation transmitted from a source in system 10 along a path designated 46 in FIG. 1 to surface 18 from which it is reflected along a path 48 to sensing means 40. The information about indirect reflecting surface 18 contained in the signal provided by sensing means 40 is the presence of absence of surface 18 within a predetermined distance from flash system 10. If the signal indicates the presence of surface 18, control means 42 causes operation of source 14 in both the first and second modes as will be described in detail presently. On the other hand, if surface 18 is not present, this information also contained in the signal causes control means 42 to operate source 14 only in the second or direct flash mode as will be described. In other words, if surface 18 is beyond the maximum distance which will permit effective indirect flash, indirect flash is not employed, and if surface 18 is at or within the maximum distance, indirect flash may be employed. The information contained in the signal provided by sensing means 40 can also include the actual distance to surface 18, i.e.

the distance indicated 52 in FIG. 1, and this combined with camera-subject ranging data can be utilized to provide automatic adjustment of flash output and camera settings and will be described presently.

Figure 2:
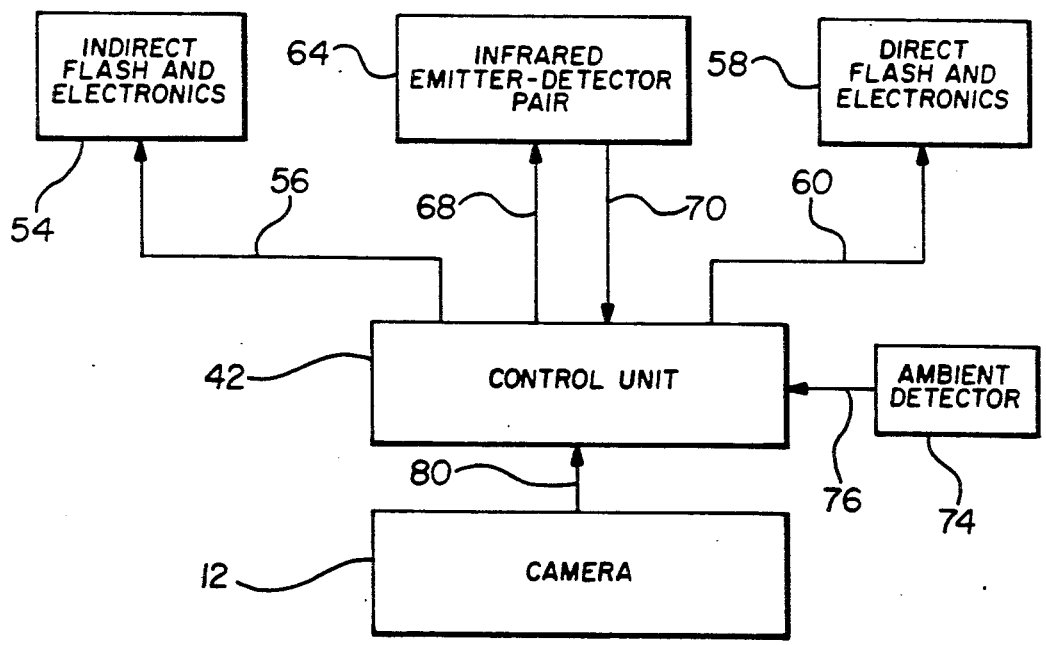
FIG. 2 is a block diagram of the system of FIG. 1.

As shown in the block diagram of FIG. 2, control means 42 is operatively connected to source of flash illumination 14 and to sensing means 40. In particular, flash tube 28 and its associated operating circuit are collectively designated indirect flash and electronics 54, and trigger signals for operating the same are transmitted thereto from control means 42 via line 56. Similarly, flash tube 32 and its associated operating circuit are collectively designated direct flash and electronics 58, and trigger signals for operating the same are transmitted thereto from control means 42 via line 60. Sensing means 40 in this embodiment of the present invention includes an infrared emitter-detector pair designated 64. A command or enabling signal is sent from control means 42 via line 68, and the signal developed by emitter-detector pair 64 is sent to control means 42 via line 70. An ambient infrared radiation detector 74 connector to control means 42 by line 76 provides a baseline or reference for sensing means 40. Control means 42 also receives information signals from camera 12 via line 80. One indicates whether the light level is below a threshold permitting flash operation. A second indicates whether the subject is within the distance range permitting flash operation. A third provides synchronization information relating to shutter release.

Figure 3:
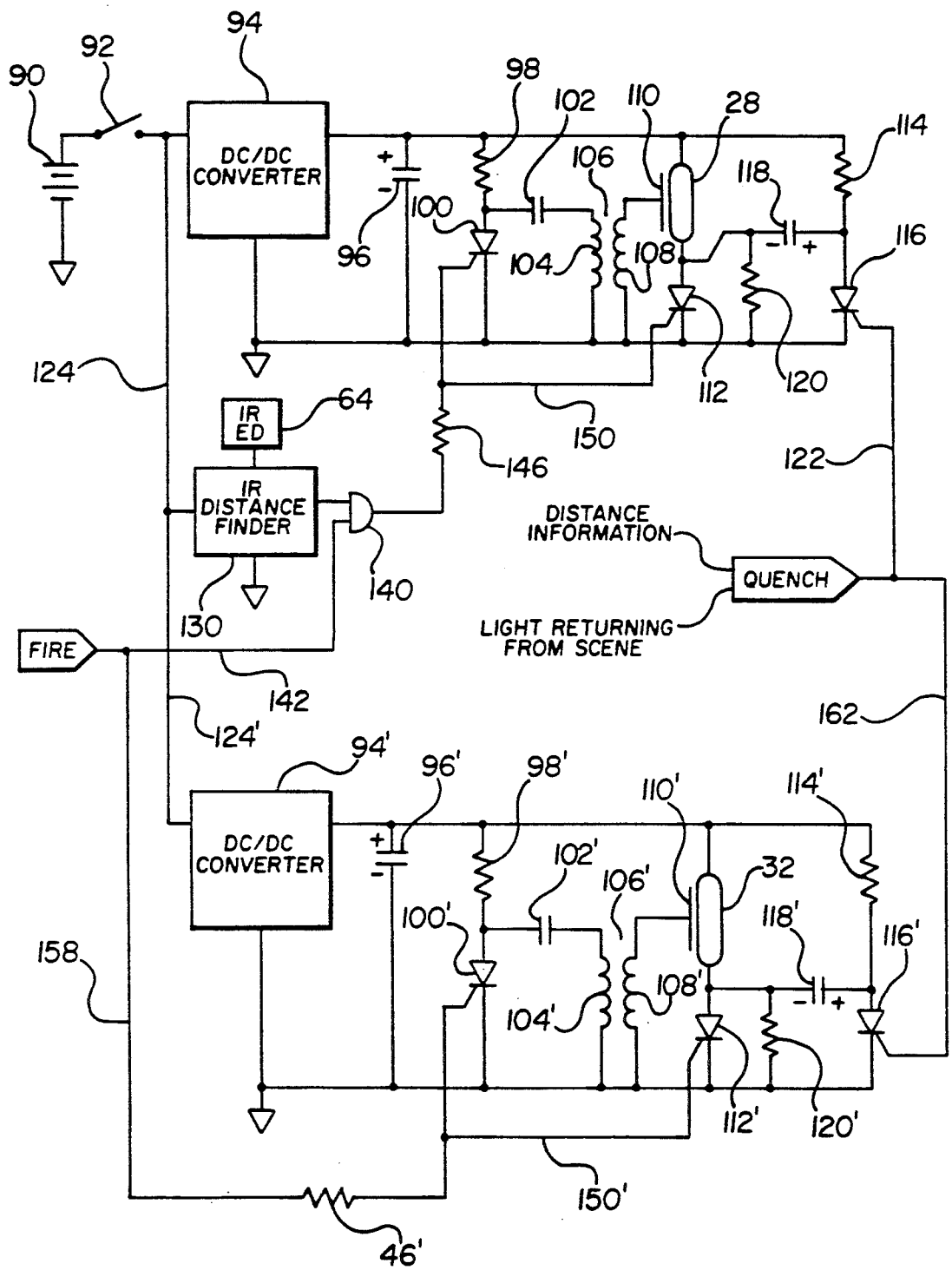
FIG. 3 is a schematic circuit diagram of the system shown in FIG. 2.

FIG. 3 is a circuit diagram of the system of FIG. 2. Turning first to the portion for operating flash tube 28, i.e. the indirect flash, the positive terminal of a battery 90 is connected through a switch 92 to the input of a D.C./D.C. converter 94, the output of which is connected to a main capacitor 96. A trigger circuit for flash tube 28 includes the series combination of resistor 98 and SCR 100 connected across main capacitor 96. The junction between resistor 98 and the anode of SCR 100 is connected to one terminal of a capacitor 102, the other terminal of which is connected to one end of the primary winding 104 of a trigger transformer 106, the other terminal of which is connected to the cathode of SCR 100. The secondary winding 108 of trigger transformer 106 is connected to the electrode 110 of flash tube 28. One terminal of flash tube 28 is connected to the junction of resistor 98 and main capacitor 96, and the other terminal of flash tube 28 is connected to the anode of an SCR 112, the cathode of which is connected to the cathode of SCR 100. The series combination of resistor 114 and SCR 116 is connected across the series combination of flash tube 28 and SCR 112. A capacitor 118 is connected between the anodes of SCR 116 and SCR 112. A resistor 120 is connected across SCR 112.

Quenching signals are applied via line 122 to the gate of SCR 116. One source of quenching signals utilizes distance information, and the other source utilizes light coming from the scene, all of which is well known to those skilled in the art. Battery 90 is also connected through switch 92 via line 124 to an input of an infrared distance finder designated 130 in FIG. 3. The output of emitter-detector pair 64, which is a signal indicative of the distance to surface 18, is connected to another input of infrared distance finder 130. The output of distance finder 130, which indicates whether surface 18 is within a predetermined range of the system 10, is applied to one input of an AND gate 140, the other input of which is connected to a flash command or fire signal on line 142. The output of AND gate 140 is connected through a current-limiting resistor 146 to the gate of SCR 100. The gates of SCRs 100 and 112 are tied together by line 150.

The portion of the circuit for operating flash tube 32, i.e. the direct flash, is substantially similar to the foregoing circuit with the exception that emitter-detector pair 64, distance finder 130 and AND gate 140 are not included in the direct flash operating circuit. Accordingly, like components are identified by the same reference numerals with prime designations. A direct flash command or fire signal on line 158 is applied through resistor 146' to the gate of SCR 100'. Quenching signals are applied via line 122 to the gate of SCR 116'. As in the indirect flash operating circuit, the sources of quenching signals utilize distance information and light returning from the scene, all in a manner which is well known to those skilled in the art.

In operation, power switch 92 is closed in response to operation of the appropriate control on camera 12 in a known manner. Converter 94 produces an output for charging main capacitor 96 to a voltage level substantially equal to the converter output in a known manner. Emitter-detector pair 64 operates to send infrared radiation along path 46 to surface 18, to receive infrared radiation reflected from surface 18 along path 48 and to provide an output signal indicative of the distance between surface 18 and the emitter-detector pair 64 in a manner which will be described in detail presently. Capacitor 102 charges to a voltage level below that of capacitor 96 determined by the magnitude of resistor 98. Capacitor 118 also charges and at the polarity indicated in FIG. 3.

If the indirect reflecting surface 18 is within the required predetermined distance from system 10, distance finder 130 produces a logical one signal to one input of AND gate 140. When the operator of camera 12 activates the exposure control, a logical one signal on line 142 is applied to the other input of AND gate 140. As a result, AND gate 140 provides an output signal which is applied through current limiting resistor 146 simultaneously to the gates of SCRs 100 and 112 turning both devices on. Capacitor 102 discharges through SCR 100 and primary winding 104 of transformer 106, and this discharge produces a high voltage pulse across the transformer secondary winding 108 for triggering or ionizing flash tube 28 in a known manner. Then, with flash tube 28 and SCR 112 conducting concurrently, capacitor 96 discharges through flash tube 28 and SCR 112 causing the flash tube to produce the indirect flash. Thereafter, when a quench command signal occurs on line 122, SCR 116 is turned on. Capacitor 118, charged to the polarity indicated in FIG. 3, suddenly sees substantially zero volts at each of its terminals due to the fact that both SCRs 112 and 116 are conducting. This causes a reversal of the polarity of the voltage across capacitor 118 turning off SCR 112 and therefore quenching flash tube 28. Resistor 120 prevents a flow of current which during operation of flash tube 28 would tend to turn off SCR 112 thereby causing premature quenching.

The operation of the portion of the circuit associated with direct flash tube 32 is substantially similar to the foregoing except that emitter-detector pair 64 and range finder 130 play no role in the operation and therefore are omitted. Thus, when the operator of the camera activates the exposure control, a signal on line 158 is applied through current limiting resistor 146' to the gates of SCRs 100' and 112' to cause operation of direct flash tube 32 in a manner similar to the operation of indirect flash tube 28. Thereafter, when a quench command signal appears on line 162, direct flash tube 32 is quenched in a manner similar to that of indirect flash tube 28. Additional descriptions of trigger and quenching circuits for direct and indirect flash tubes can be found in U.S. Pat. No. 4,384,238 issued May 17, 1983, the disclosure of which is hereby incorporated by reference.

Thus, when indirect reflecting surface 18 is within a predetermined distance or range of system 10, as determined by emitter-detector pair 64 and range finder 130, the circuit of FIG. 3 operates to fire both indirect flash tube 28 and direct flash tube 32. However, when indirect reflecting surface 18 is not present or is beyond the predeterminded distance, the output of range finder 130 is a logical zero signal, there is no output from AND gate 140, indirect flash tube 28 is not fired and only direct flash tube 32 is fired.

By way of example, in an illustrative system, emitter-detector pair 64 and distance finder 130 provide signal information relating to the distance between indirect reflecting surface 18 and system 10 by a triangulation method. In particular, the emitter is a light-emitting diode which radiates pulsed infrared rays to surface 18 and the detector is a position sensitive detector. A right triangle is defined wherein the hypotenuse is path 48 shown in FIG. 1, the longer of the two legs is path 46, and the shorter leg is the distance between the center of the light emitting diode and the point where light along path 48 is incident on the position sensitive detector. The two legs are of course at right angles to each other. As the distance between system 10 and surface 18 varies, the point of incidence of the reflected infrared beam 48 on the position sensitive detector also will vary. The distance between system 10 and surface 18 is determined by the relationship $L = 1/x(f)(B)$ where L is the distance from system 10, i.e. from the light emitting diode to surface 18, B is the distance between the centers of the light emitting diode and the position sensitive detector, f is the focal length between either the light emitting diode or position sensitive detector and its corresponding lens, and x is the distance between the point of incidence of the reflected beam 48 on the position sensitive detector and the center of the position sensitive detector. The variable x is a function of the distance between the light emitting diode and surface 18 and is determined in the following manner.

When infrared radiation is incident at a spot on the surface of the position sensitive detector, an electric charge proportional to the light energy is generated at the point of incidence which creates photo currents flowing in opposite directions from that spot. The photo currents collected at spaced apart electrodes are inversely proportional to the distances between the spot and the electrodes, and from this the spot or position or location of incidence can be determined. From that, the variable x can be determined.

By way of example, in an illustrative system, the emitter detector pair 64 and the range finder 130 is commercially available from Hamamatsu under the commercial designation Range Finder IC and which provides an output signal when surface 18 is in the range from about 1 to about 5 feet from system 10. By way of further example, in an illustrative circuit, battery 90 provides three volts or six volts output depending upon the camera system configuration, the output of converter 94 is about 330 volts, main capacitor 96 charges up to a voltage of about 330 volts, capacitor 102 charges to about 280 volts, and the primary to secondary turns ratio of trigger transformer 106 is about 1:50. Ambient detector 74 substracts the infrared component of the ambient light for a more precise distance measurement.

Thus, the system and method of FIGS. 1-3 advantageously removes the decision process from the photographs and replaces it with an intelligent indirect reflection surface or ceiling detection circuit. Another significant advantage is that detection of the ceiling or indirect reflecting surface is not influenced by the reflectance of the subject or the proximity of the subject-background surface. As a result, image quality is improved. Furthermore, since the exposure resulting from electronic flash emissions is directly related to the flash-subject distance, a measurement of the ceiling height or distance to the indirect reflecting surface significantly increases the reliability of bounce flash exposure determinations and system performance. The system and method also provides savings of energy and recycle time if no ceiling or indirect reflecting surface is detected.

Figure 4:
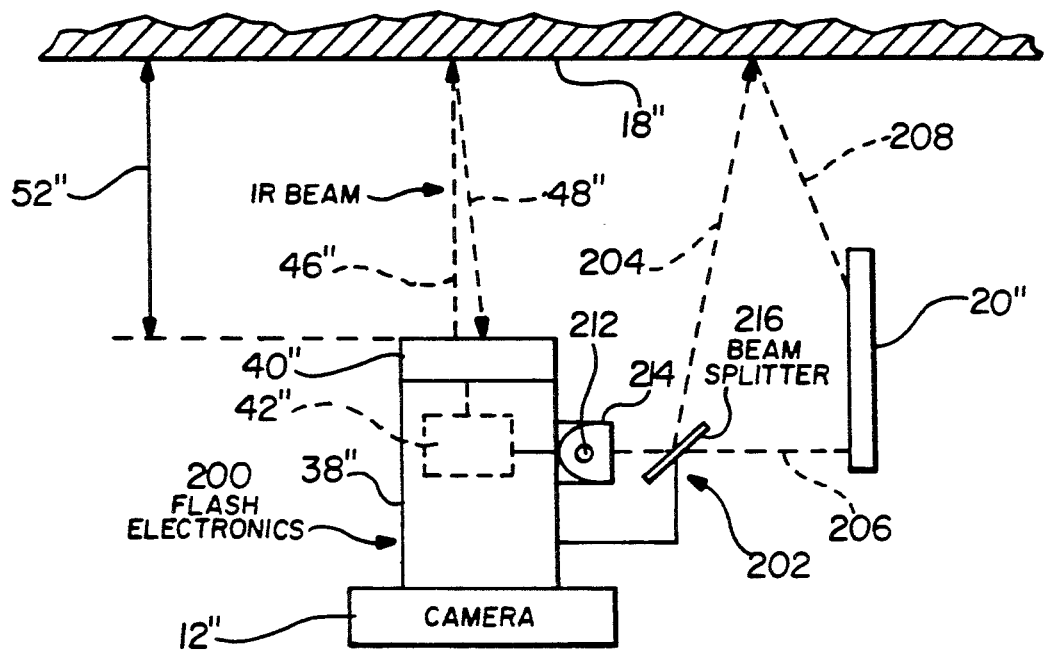
FIG. 4 is a diagrammatic view of an alternative form of the system of FIG. 1.
Figure 5:
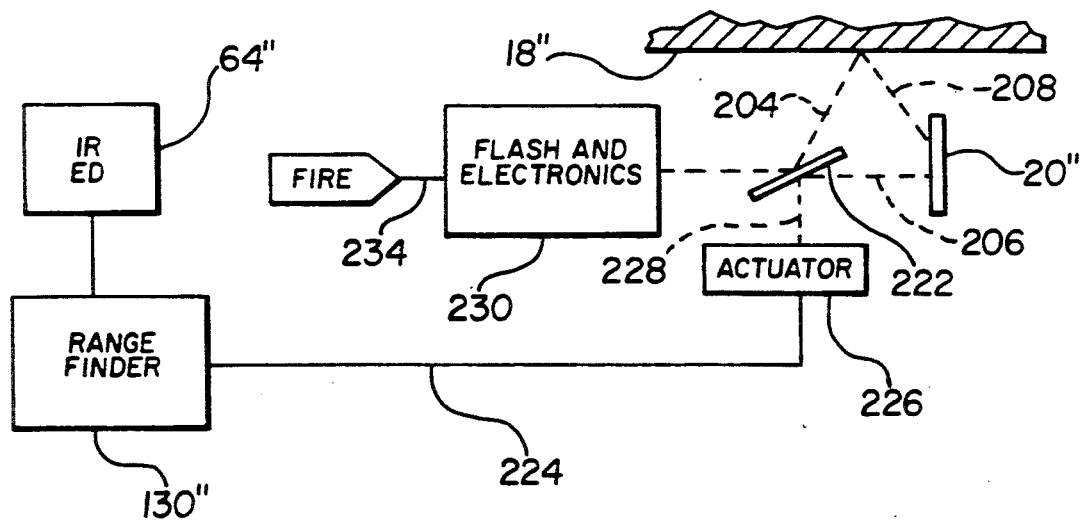
FIG. 5 is a block diagram of the system of FIG. 4.

In the system of FIGS. 1-3, the source of flash illumination includes the separate flash tubes 28 and 32 for providing indirect and direct flash, respectively. FIGS. 4 and 5 illustrate an alternative approach wherein the source of flash illumination comprises a single flash tube and controlled means for separating the output of the single tube into separate direct and indirect beams. For convenience, components in the system of FIGS. 4 and 5 are identical to those in the system of FIGS. 1-3 are identified by the same reference numeral with a double prime designation. Thus, system 200 is combined with camera 12" and includes a source 202 of flash illumination which operates selectively in a first mode for projecting light in a first direction 204 toward indirect reflecting surface 18" to illuminate subject 20" indirectly and in a second mode for projecting light in a second direction 206 to illuminate subject 20" directly. Light from source 202 travelling along path 204 is reflected by surface 18" along path 208 toward subject 20". Source 202 comprises a single flash tube 212 and reflector 214 together with means 216 for selectively separating the output of flash tube 212 into indirect and direct beams. In particular, flash tube 212 and reflector 214 are mounted on housing 38" and are disposed to normally project the entire output thereof directly at subject 20" in the direction 206. The separating means 216 has a first state for passing the entire output of flash tube 212 in the direction 206 and a second state for deflecting a portion of the output along the path 204 in FIG. 4 toward indirect reflecting surface 18". The separating means 216 can comprise a beam splitter in the form of a partially silvered mirror or a separator lens.

As in system 10 of FIGS. 1-3, system 200 comprises sensing means 40" utilizing electromagnetic radiation reflected from indirect reflecting surface 18" directly to the sensing means for providing a signal containing information about surface 18", and control means 42" for controlling the operation of source 202 in the two modes as determined by the information and the signal from sensing means 40". In particular, infrared radiation is transmitted from a source in system 200 along a path designated 46" to surface 18" from which it is reflected along a path 48" to sensing means 40". The information about indirect reflecting surface 18" contained in the signal provided by sensing means 40" is the presence or absence of surface 18" within a predetermined distance from flash system 200. If the signal indicates the presence of surface 18" within the predetermined distance, control means 42" places separating means 216 in the second state as shown in FIG. 4 where it deflects a portion of the flash light beam along path 204 and passes the remainder along path 206. On the other hand, if surface 18" is not present or is located beyond the predetermined distance, this information which is contained in the signal causes control means 42" to place separating means 216 in the first state where it allows the entire flash light beam to travel along the direct path 206. In other words, if surface 18" is beyond the maximum distance which will permit effective indirect flash, indirect flash is not employed, and if surface 18" is at or within that maximum distance, indirect flash may be employed. The information contained in the signal provided by sensing means 40" can also include the actual distance to surface 18", i.e. the distance indicated at 52" in FIG. 4, and this combined with camera-subject ranging data can be utilized to provide automatic adjustment of flash output and camera settings as will be described presently.

As shown in the block diagram of FIG. 5, the control means 42" comprises an emitter detector pair 64" and distance finder 130" as in the previous embodiment. In the present illustration, separating means 216 comprises a beam splitter 222. The output of direction finder 130" is connected by a line 224 to an electromechanical actuator 226 which is mechanically coupled to beam splitter 222 as indicated by the broken line 228. The single flash tube 212 and its associated operating, trigger and quenching circuitry is designated 230 in FIG. 5. The circuitry designated 230 is identical to the operating, triggering and quenching circuitry shown in FIG. 3. Thus, when indirect reflecting surface 18" is within a predetermined range, range finder 130" produces an output signal which is applied by a line 224 to actuator 226 which operates to switch or move beam splitter 222 to the state shown in FIG. 5. Then when the operator of the camera actuates the exposure control, a fire command signal on line 234 causes the trigger and operating circuitry to fire flash 212. The output flash light beam is divided by beam splitter 222 into the direct and indirect components 206 and 204, respectively. On the other hand, if reflecting surface 18" is not within the predetermined range, there is no signal output produced by range finder 130" and actuator 226 is not operated and beam splitter remains in the first state where it allows the entire output of the flash tube 212 to travel along the direct path 206. Typically that state of beam splitter 222 would be disposed in a horizontal position as viewed in FIG. 5.

Figure 6:
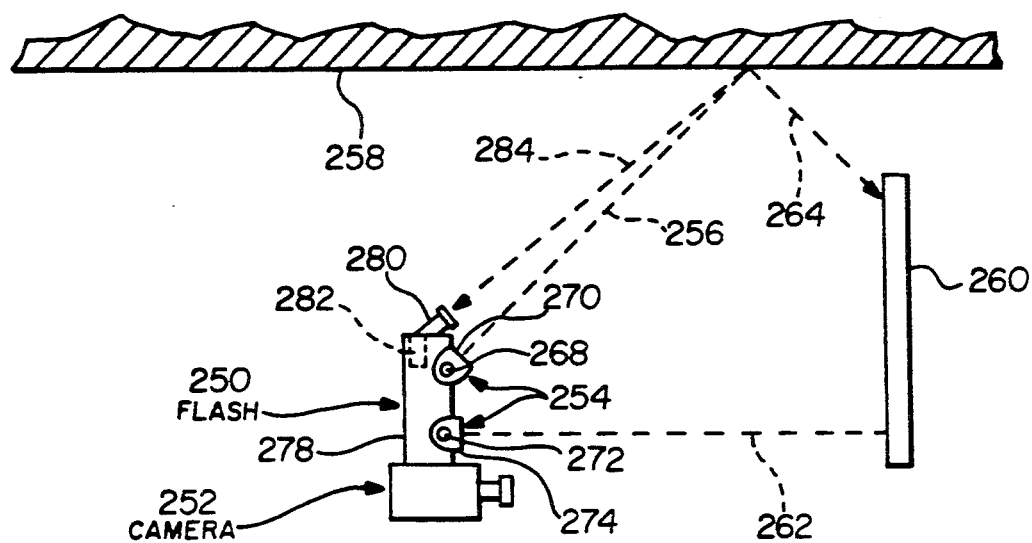
FIG. 6 is a diagrammatic view illustrating a flash system and method of providing artificial illumination for image capture according to another embodiment of the present invention.
Figure 7:
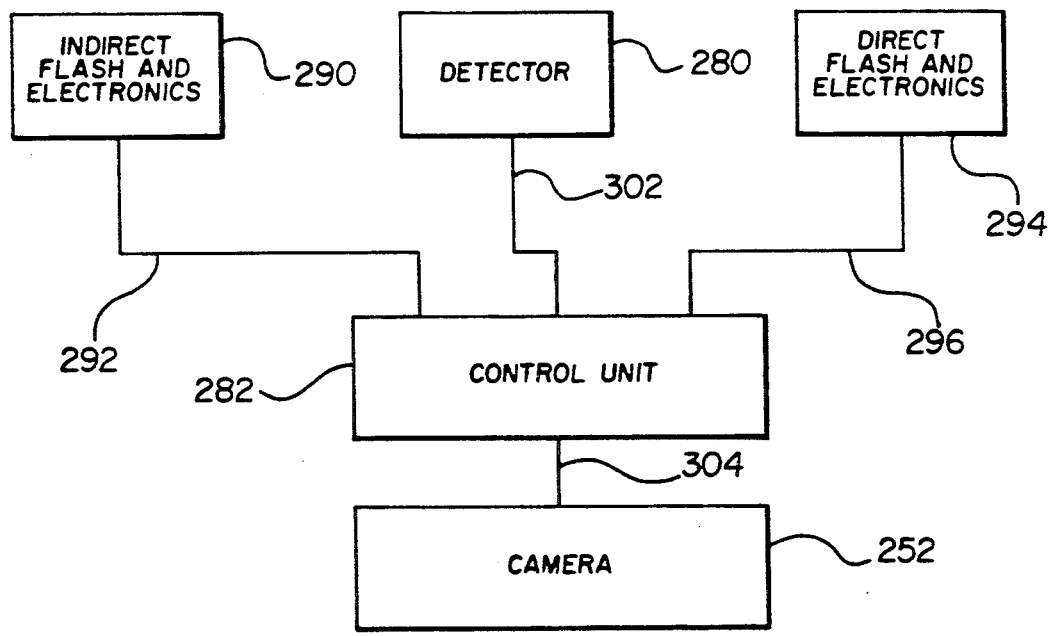
FIG. 7 is a block diagram of the system of FIG. 6.
Figure 8:
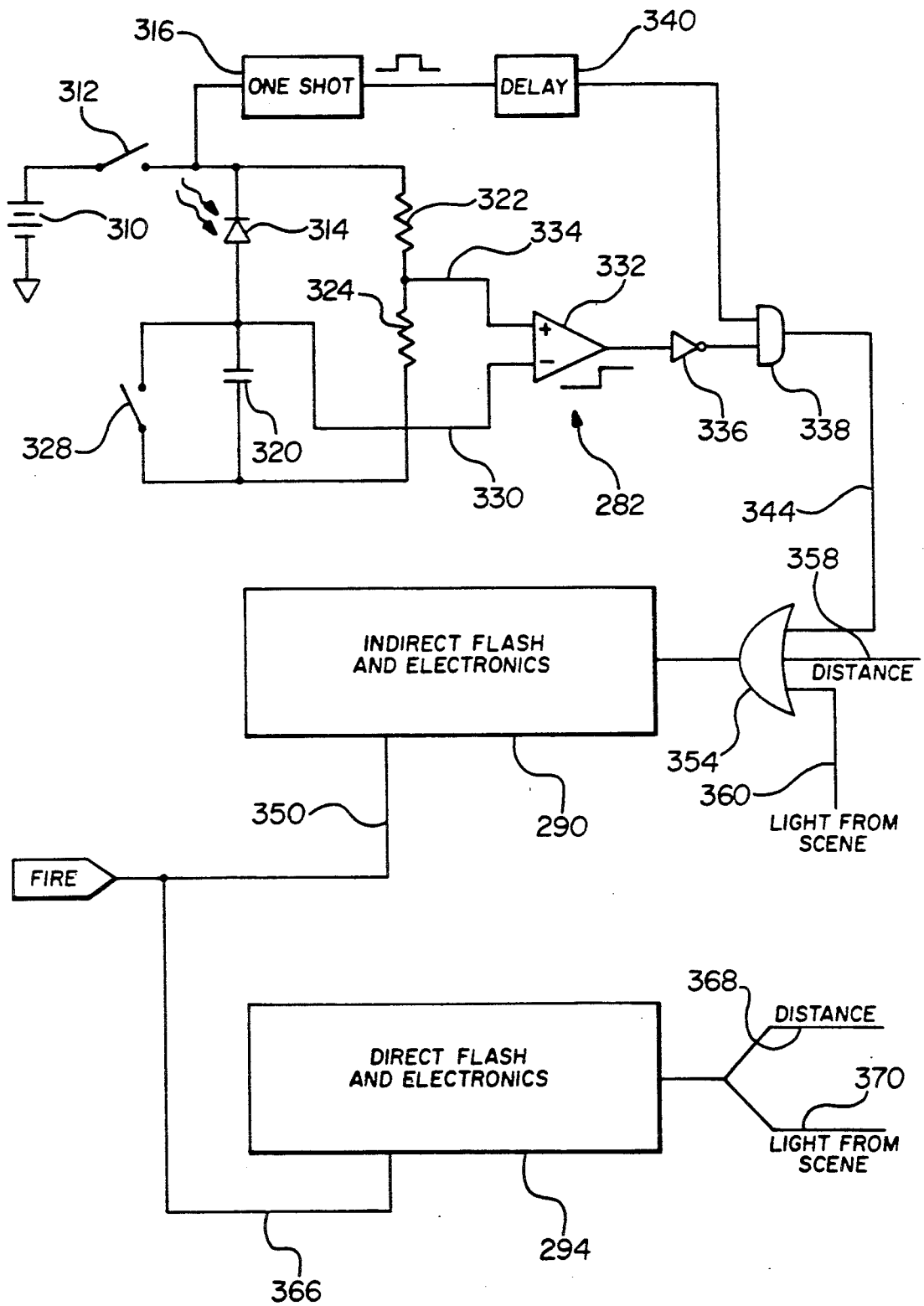
FIG. 8 is a schematic circuit diagram of the system shown in FIG. 7.

In the embodiment of FIGS. 1–5, a separate or dedicated source of electromagnetic radiation is employed to obtain information about the indirect reflecting surface. FIGS. 6–8 illustrate an embodiment of the present invention wherein light reflected from that surface directly back to the flash system during the indirect flash mode is utilized to obtain information about the surface. Referring to FIG. 6, the flash system 250 is shown in combination with a conventional camera 252 and includes a source of flash illumination generally designated 254 which operates selectively in a first mode for projecting light in a first direction 256 toward an indirect reflecting surface 258 to illuminate a subject 260 indirectly and in a second mode for projecting light in a second direction 262 to illuminate subject 260 directly. Light from source 254 travelling along path 256 is reflected by surface 258 along path 264 toward subject 260. As in the previous embodiment, indirect reflecting surface 258 typically is the ceiling in a room where the subject is being photographed. In the flash system 250 shown in FIG. 6, source 254 comprises separate components for indirect and direct illumination. In particular, a first component includes a flash tube 268 and reflector 270 which are arranged to project a flash light beam toward the indirect surface 258, i.e. upwardly, in the arrangement shown in FIG. 6, so that upon reflection from the overhead surface 258, the subject 260 can be illuminated indirectly in a way characteristic of the natural lighting of the sun. A second component includes a flash tube 272 and reflector 274 arranged to project a flash light beam directly at the subject 260 to provide fill-in to soften any dark shadows thereon. The first and second components of source 254 are mounted on a housing 278.

In accordance with the present invention, flash system 250 comprises sensing means 280 utilizing electromagnetic radiation reflected from indirect reflecting surface 258 directly to the sensing means for providing a signal containing information about the indirect reflecting surface, and control means 282 for controlling the operation of the source 254 in the two modes as determined by the information and signal from the sensing means. The sensing means 280 and control means 282 are carried by housing 278. In this embodiment of the present invention, sensing means 280 is located to receive light reflected from the indirect reflecting surface 258 directly to the sensing means 280 during operation of source 254 in the first mode for providing a signal indicating the presence of the indirect reflecting surface. This light reflected back to sensing means 280 is indicated by path 284 in FIG. 6. The information about indirect reflecting surface 258 contained in the signal provided by sensing means 280 is the presence or absence of surface 258.

Control means 282 continues operation of source 254 in the first or indirect mode when the signal from sensing means 280 indicating the presence of surface 258 is received within a predetermined time and also continues operation of source 254 in the second or direct mode. However, if the signal from sensing means 280 is not received within the predetermined time, control means 282 terminates operation of source 254 in the first mode and continues operation in the second mode. Alternatively, a preset signal level threshold can be established and if the signal from sensing means 280 is at or above the threshold, an efficient indirect flash reflecting surface is assumed, and indirect flash is permitted. If the signal from sensing means 280 is below the threshold, indirect flash is not permitted. Also, a signal strength analysis circuit may be employed to equate the intensity of the returning preflash with the efficiency of the indirect reflecting surface. The reflecting surface efficiency value then is applied to an exposure control system which alters the primary flash power output or varies the camera exposure settings, e.g. aperture.

As shown in the block diagram of FIG. 7, control means 282 is operatively connected to the source of flash illumination 254 and to sensing means 280. In particular, flash tube 268 and its associated operating circuitry are collectively designated indirect flash and electronics 290 and trigger signals for operating the same are transmitted thereto for control means 282 by a line 292. Similarly, flash tube 272 and its associated operating circuitry are collectively designated direct flash electronics 294 and trigger signals for operating the same are transmitted thereto from control means 282 by a line 296. Sensing means 280 in this embodiment comprises a photodetector and circuit which is connected to control means 282 by a line 302. Control means 282 also receives information from camera 252 by a line 304 which is the same information described in connection with the embodiments of 1–5. The system and method shown in FIGS. 6 and 7 has the same advantages as the system and method of FIGS. 1–5.

FIG. 8 is a circuit diagram of the system of FIG. 7. Turning first to the sensing means 280, the positive terminal of a battery 310 is connected through a first switch 312 to the cathode of a light responsive diode or photodetector 314 and to the input of a one-shot monostable-multivibrator circuit 316. The anode of photodetector 314 is connected to one terminal of an integrating capacitor 320 and a voltage divider comprising the series combination of resistors 322 and 324 is connected across the combination of the photodetector 314 and capacitor 320. A second switch 328 is connected across the capacitor 320. The junction of photodetector 314 and capacitor 320 is connected via line 330 to the inverting input of an operational amplifier or comparator 332, and the non-inverting input thereof is connected by a line 334 to the junction of resistors 322 and 324. The output of comparator 332 is connected through an inverter 336 to one input of an AND gate 338. The output of one-shot 316 is coupled through a delay circuit 340 to the other input of AND gate 338. The output of AND gate 338 on line 344 is used to provide controlled quenching of indirect flash tube 268 as will be described presently.

The operating, triggering and quenching circuit for indirect flash tube 268 is represented by block 290 in FIG. 8 and is identical to the circuit associated with flash tube 28 shown in FIG. 3 with the exception that here the range finder 130, AND gate 140 and resistor 148 are not employed. A fire command signal on line 350 is applied to the trigger portion of circuit 290, i.e. to the gates of SCRs corresponding to SCRs 100 and 112 in FIG. 3. An OR gate 354 is connected to the quenching portion of the circuit 290, i.e. to the gate of an SCR corresponding to SCR 116 in the circuit of FIG. 3. Two inputs to OR gate 354 on lines 358 and 360 are signals containing distance information about subject and light returning from the scene as in the circuit of FIG. 3. The third input to OR gate 354 is line 344 from the output of AND gate 338 in the circuit of sensing means 280.

The operating, triggering and quenching circuit for direct flash tube 272 is represented by block 294 and is identical to the circuit associated with flash tube 32 shown in FIG. 3. A fire command signal on line 366 is applied to the trigger portion of circuit 294, i.e. to the gates of SCRs corresponding to SCRs 100' and 112' in FIG. 3. Quenching signals on line 368 and 370 are applied to the quenching portion of the circuit 294 i.e. to the gate of an SCR corresponding to SCR 116'. Signals containing information as to subject distance and light returning from the scene are provided on lines 368 and 370 for quenching as in the previous embodiment.

In operation, when the user of the camera actuates the exposure control, fire command signals are provided on line 350 and 366 causing simultaneous operation of indirect flash tube 268 and direct flash tube 272. The direct flash light beam travels along path 262 shown in FIG. 6. The indirect flash light beam travels along paths 256 and 264. A portion of the indirect flash light beam is reflected by surface 258 along path 284 back to sensing means 280 and is incident on photodetector 314 causing it to conduct. With switch 312 closed and switch 328 opened, capacitor 320 charges up and the voltage thereon is applied to one input of comparator 332. When this voltage exceeds the threshold voltage applied to the other comparator input, as established by voltage divider 322, 324, comparator 322 provides an output signal which is transformed by inverter 336 to a logical zero input to AND gate 338. After the time delay established by component 340, the output of one-shot 316 is applied as a logical one input to AND gate 338. The logical zero and one inputs to AND gate 338 result in a zero or low level output signal and accordingly there is no quenching signal on line 344. Thus, the presence of indirect reflecting surface 258 is sensed by the circuit and it permits continued operation of the source of flash illumination in the direct mode. However, if surface 258 is not present, no reflected light is incident on photodetector 314, there is no output from comparator 322 and a logical one input is provided to AND gate 338. When the delayed pulse from one-shot 316 arrives at the AND gate 338, the two logical one inputs cause AND gate 338 to provide a high level output level signal on line 344 which is applied as a quenching signal to circuit 290 thereby terminating the flash output of flash tube 268.

By way of example, in an illustrative circuit, battery 310 is a three volt or six volt battery depending upon the system configuration, photodetector 314 is type MRD 500, comparator 322 is type LP339, resistors 322 and 324 are of comparable magnitudes and capacitor 320 has a value in the range 0.1 microfarads to 1 microfarads. The axis of indirect flashtube 268 and reflector 270 is disposed at an angle of about 75 degrees to the subject-camera axis which is the same as the arrangement in the system of FIG. 1. The axis of photodetector 314 is disposed substantially parallel to the axis of indirect flashtube 268 and reflector 270, i.e. is disposed at about 75 degrees to the subject-camera axis.

The system and method of FIGS. 6–8 advantageously are not influenced by the reflectance of the subject. Since the actual reflecting surface efficiency is measured, errors arising from measuring the subject reflectance are avoided. As a result, image quality is improved. Furthermore, the amount of light needed from the indirect flash tube to detect the ceiling or indirect reflecting surface is less since it does not have to bounce off the subject and travel back to the camera. This technique will shorten recycle time if no ceiling or indirect reflecting surface is present since less power is needed. Another important advantage of the system and method of FIGS. 6–8 is that detection of the indirect reflecting surface or ceiling is automatic, requiring no participation or intervention by the user.

Figure 9:
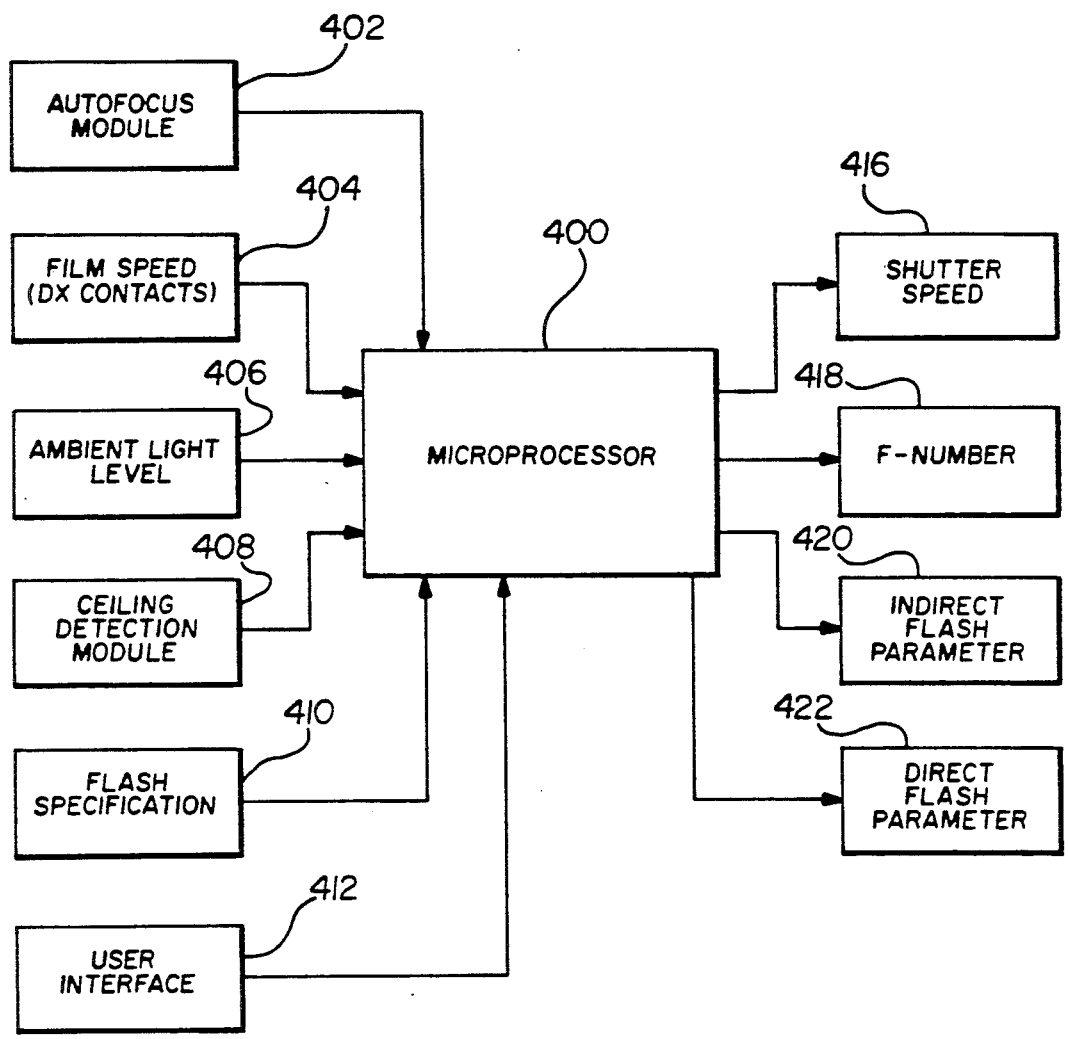
FIG. 9 is a system block diagram illustrating a microprocessor-controlled camera utilizing the flash system and method of the present invention.

FIG. 9 is a block diagram of a microprocessor controlled camera system utilizing the flash system and method providing indirect reflecting surface detection according to the present invention. The microprocessor generally designated 400 receives a number of data signal inputs indicated along the left-hand portion of FIG. 9. The autofocus module 402 is a ranging circuit providing subject distance information. An example is that found in Kodak S1100 cameras. The film speed data input 404 is a signal obtained by reading coded conductive areas on the film cartridge (DX system) in a manner known to those skilled in the art. Ambient light level 406 is the output of a photodetector. The ceiling or indirect reflecting surface detection module 408 is the sensing means in the system of the present invention. In particular, it can comprise the emitter-detector pair 64 and infrared radiation direction finder 130 of the embodiment of FIGS. 1-5. It can also comprise the photodetector 314 and associated circuitry of the embodiment of FIGS. 6-8. Flash specification 410 is hard wired information of maximum output expressed as the guide number where guide number equals the product of subject distance and f. number, which yields normal exposure as is well known to those skilled in the art. User interface 412 represents input selections or commands such as no flash, rapid recycle or no indirect flash as will be described.

The microprocessor 400 provides various control signal outputs indicated along the right-hand portion of FIG. 9. Shutter speed 416 and F-number 418 are control signals supplied to appropriate parts of the camera as is well understood by those skilled in the art. Indirect flash parameters 420 are the various control signals applied to the indirect flash and electronic components 54 and 290 in the systems of the two embodiments of the present invention. Similarly direct flash parameters 422 are the control signals applied to the direct flash and electronic components 58 and 294.

Figure 10:
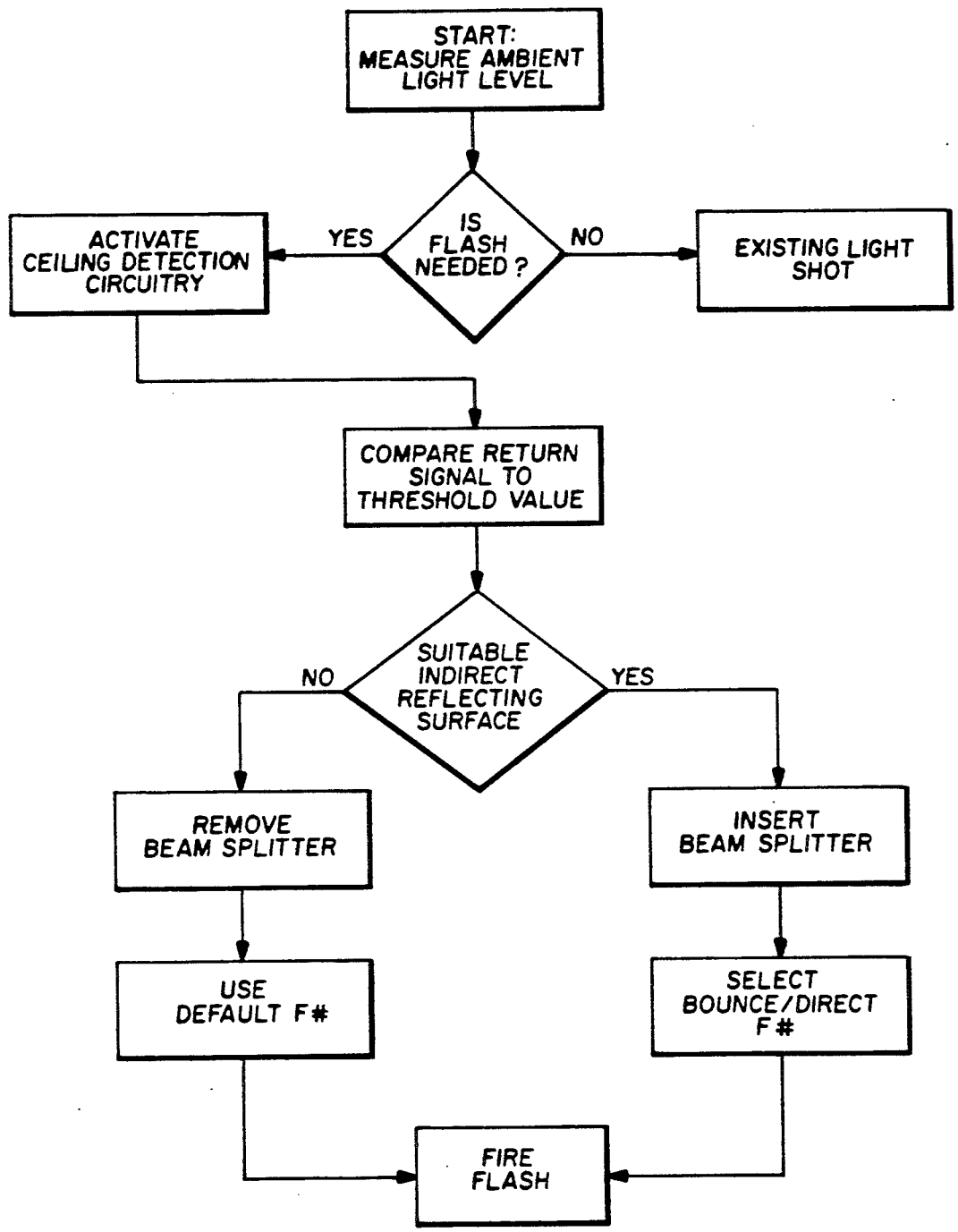
FIGS. 10-14 are program flow charts illustrating operation of the camera system of FIG. 9.

FIGS. 10-14 are program flow charts illustrating the operation of the system of FIG. 9 in the implementation of the various embodiments of the present invention. By way of example, in an illustrative camera system, a microprocessor capable of such implementation is in the Motorola 68000 family. FIG. 10 illustrates implementation of the system of FIG. 4 which employs the binary ceiling or indirect reflection surface detection circuit 40" and a single flashtube 212. The flashtube 212 emits a constant amount of energy (fixed output). If the ceiling detection circuit 40" indicates that a suitable indirect reflecting surface 18" is present, the beam-splitter 216 or separator lens is moved in front of the flashtube. The beam-splitter deflects a portion of the light towards the indirect reflecting surface and the remaining light is emitted along the camera-subject axis. If a suitable indirect reflecting surface is not detected, the beam-splitter is omitted and all of the light is projected along the camera-subject axis. This simple design is well suited for an inexpensive camera without subject ranging information. Since camera-subject distance is not known, camera aperture selection is varied according to the flash mode (direct/indirect) as shown in FIG. 10. The indirect-direct flash mode requires a larger lens opening than the direct flash mode, if equivalent flash range is desired. That is because in the indirect-direct mode the path length of the flash emission beam is longer than in the direct flash mode. If maximum range for direct flash is desired, then the same aperture could be used for both modes. However, the direct flash exposure mode would produce additional overexposures at close distances.

Figure 11:
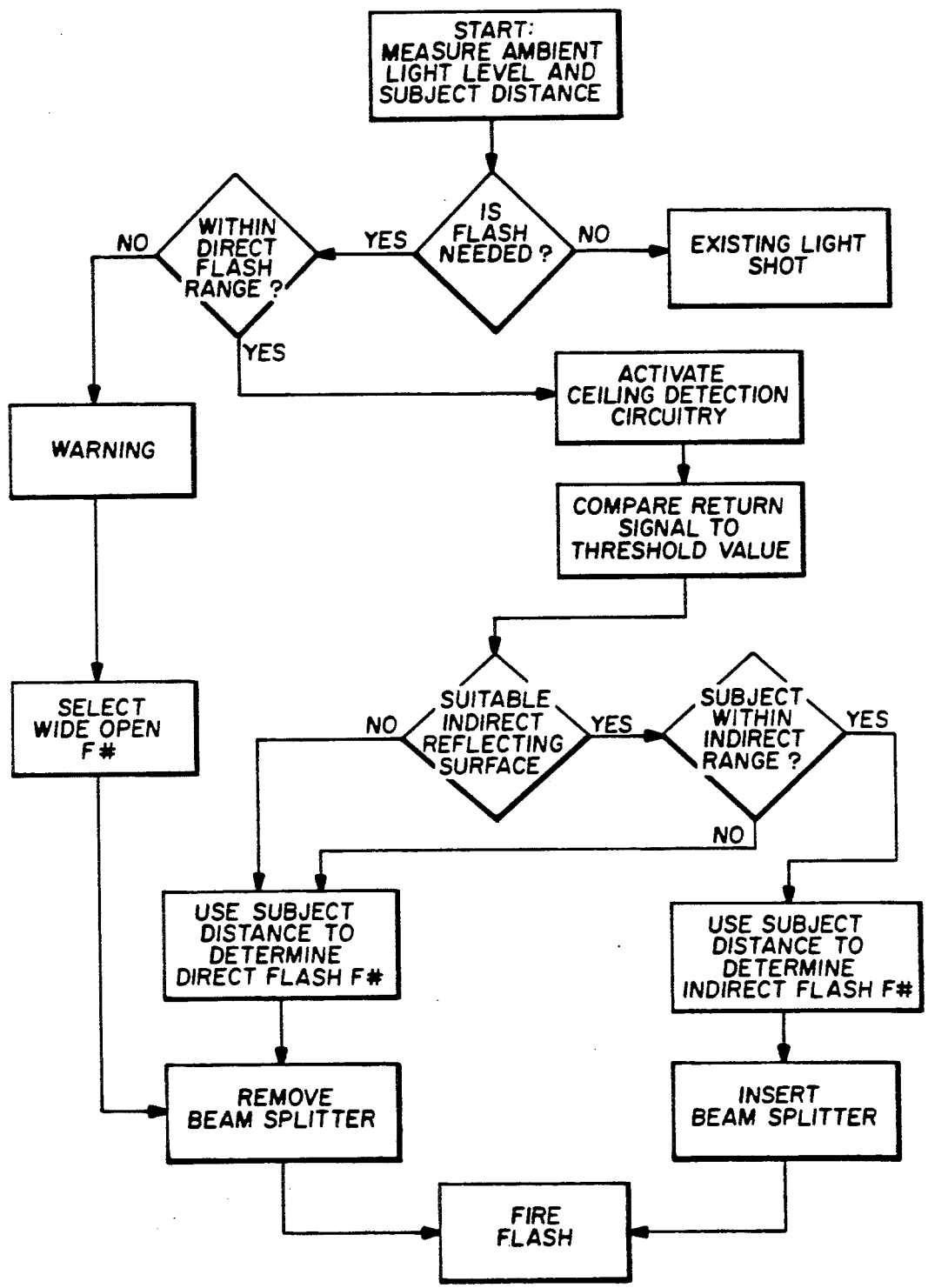

The flow diagram of FIG. 11 depicts an enhancement of the FIG. 10 system and which involves the addition of camera auto-ranging and the associated flashmatic exposure control system. The flashmatic system selects the appropriate camera aperture based on camera-subject distance information and a known flash output. The flashmatic system is analagous to guide number calculations (GN=(f#) (Distance) which specify the appropriate aperture for a normal exposure on the principal subject. If the direct flash mode is selected (a suitable indirect reflecting surface is not present), the aperture selection is based on the default flashmatic program. If the indirect-direct mode is selected (a suitable indirect reflecting surface is present), the flashmatic program is shifted to larger lens openings. Larger lens openings are required to offset the light losses and longer path length resulting from the use of an indirect reflecting surface. In this way, uniform exposure is maintained on the principal subject, regardless of the illumination mode which is selected.

Figure 12:
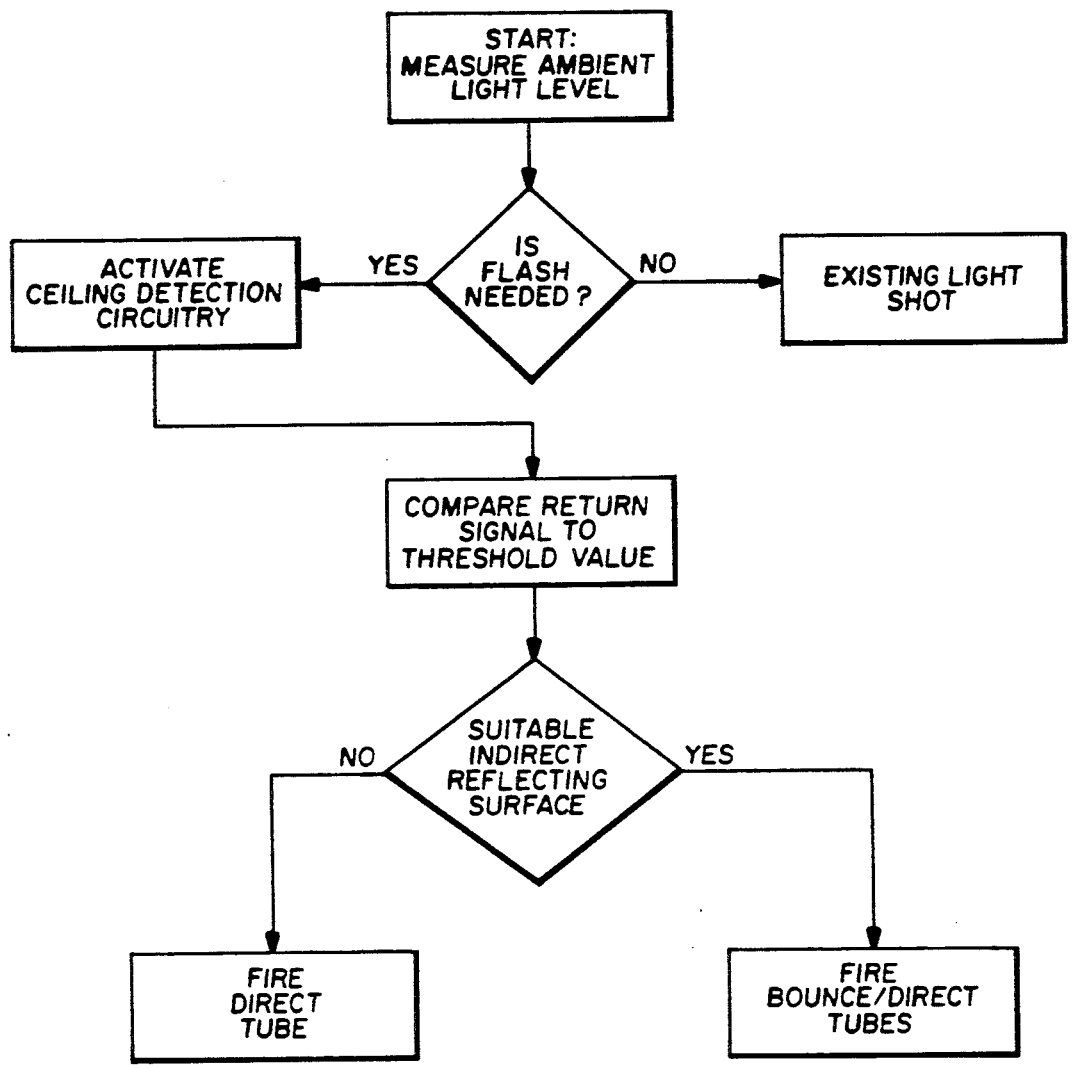
Figure 13:
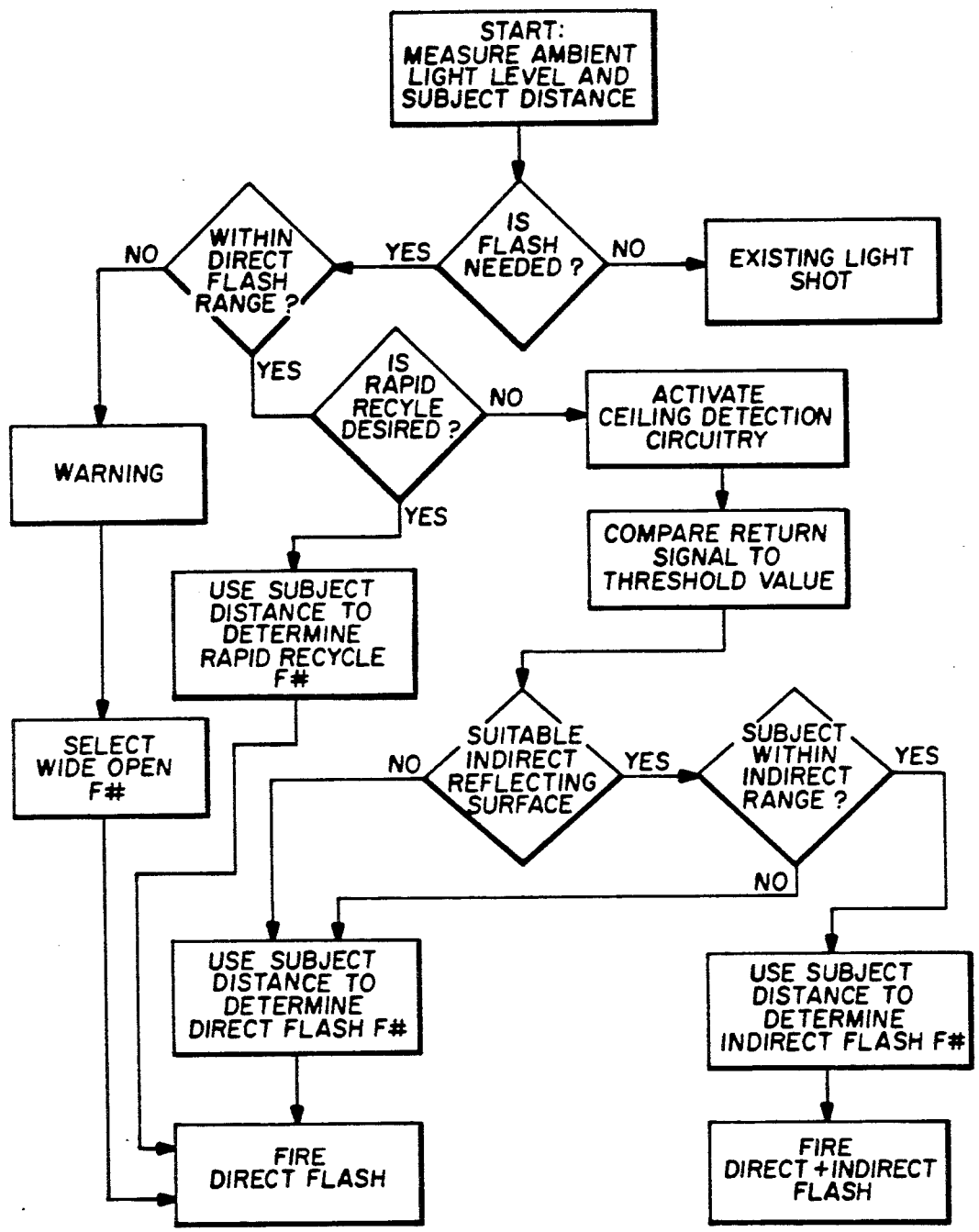

FIG. 12 illustrates implementation of the system of FIG. 1. In this case, if a suitable indirect reflecting surface is not detected, only the direct tube 32 is fired. If a suitable indirect reflecting surface is detected, both the direct 32 and the indirect 28 tubes are fired. Since this simple system does not include subject ranging information, the output of the two tubes is fixed and the same aperture is always employed. Although the outputs are fixed, they may not be identical. The indirect flashtube 28 must emit more energy than the direct tube 32 to illuminate a subject at an equivalent distance.

If camera auto-ranging and flashmatic systems are added, a number of unique flash exposure control methods are possible. The method shown in the flow diagram of FIG. 13 relies on fixed light output (at two different levels) from the bounce and direct tubes. If a suitable indirect reflecting surface is not detected, the direct tube fires and a camera aperture based on the subject distance is selected (default flashmatic program). If a suitable indirect reflecting surface is detected, both tubes fire.

Figure 14:
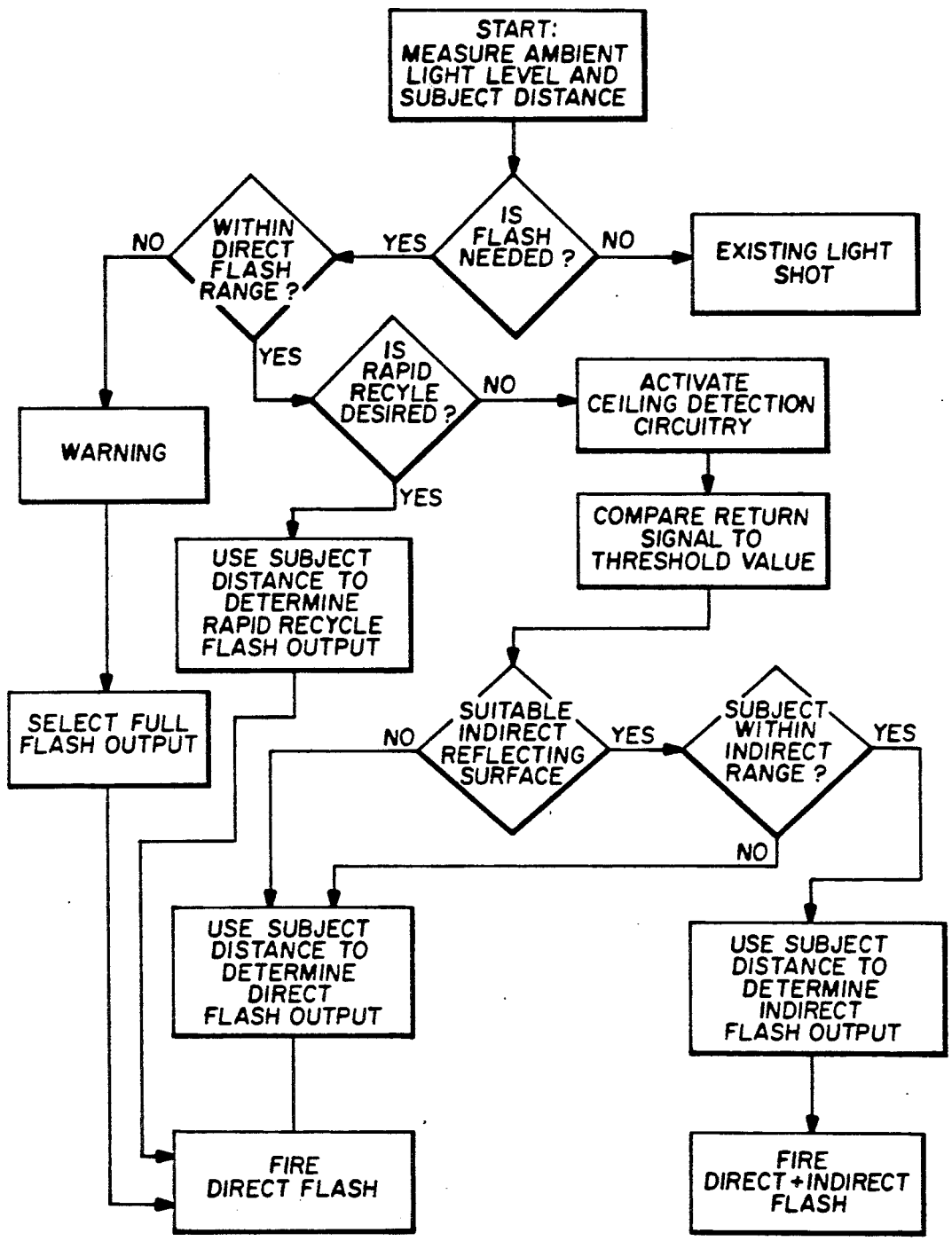

Another method, detailed in the flow diagram of FIG. 14, uses the camera-subject ranging information in a unique way. Instead of varying the aperture and maintaining a fixed light output, the aperture is held constant and the light output is varied. The distance information may be used to calculate a unique flash power output for each subject distance, or the output may be varied incrementally (e.g. in steps). This method provides the option for selecting direct-indirect flash illumination ratios which vary with subject distance.

Variable flash output and aperture selection can be combined in a single system to match the optical depth of field with the depth of illumination provided by the flash light source. Operation of the single system would be illustrated by a composite of FIGS. 13 and 14. In this connection, it is important to note that in this combined system as well, the variable power output is not based on scene reflectance quenching, but on reliable camera-subject distance information.

The variable output capability also permits the addition of another unique feature; a quick recycle mode. If maximum flash range is not desired the system may be configured, as in the flow diagrams 11, 13 and 14, such that selection of a direct-flash-only mode results in a lower power output and larger lens aperture. As a result, the flash capacitor will recover much sooner and flash recycle times will be reduced significantly. The reduction in recycle times will permit rapid fire flash photography.

It is therefore apparent that the present invention accomplishes its intended objects. While embodiments of the present invention have been described in detail, that is for the purpose of illustration, not limitation.

We claim:

1. A flash system for providing artificial illumination for image capture comprising:

a) a source of flash illumination which operates selectively in the first mode for projecting light in a first direction toward an indirect reflecting surface located in spaced relation to a subject to illuminate the subject indirectly and in a second mode for projecting light in a second direction to illuminate the subject directly;

b) sensing means utilizing electromagnetic radiation reflected from the indirect reflecting surface for providing a signal containing information about the indirect reflecting surface, said sensing means being positioned to receive electromagnetic radiation reflected from the indirect reflecting surface and not directly from the subject; and c) control means operatively connected to said source of flash illumination and to said sensing means for controlling the selective operation of said source in said first and second modes as determined by the information in said signal from said sensing means.

2. A flash system according to claim 1, wherein said sensing means comprises means for transmitting electromagnetic radiation to the indirect reflecting surface in a manner such that a portion of the radiation is reflected from said surface and detecting means for receiving radiation reflected from the surface and providing a signal containing information relating to the distance between the surface and a given location and wherein said control means is operatively connected to said source of flash illumination and to said detecting means for causing operation of said source in both said first and second modes when the indirect reflecting surface is within a predetermined distance of said given location and for causing operation of said source only in said second mode when said surface is not within said predetermined distance.

3. A flash system according to claim 1, wherein said sensing means is located to receive light reflected from the indirect reflecting surface directly to said sensing means during operation of said source in said first mode for providing a signal indicating the presence of the indirect reflecting surface and wherein said control means is operatively connected to said source of flash illumination and to said sensing means for continuing operation of said source in said first mode when said signal is received within a predetermined time and then causing operation of said source in said second mode and for ceasing operation of said source from said first mode and operating said source in said second mode if said signal is not received within the predetermined time.

4. A flash system according to claim 1, wherein said source of flash illumination comprises separate indirect and direct flash light beam sources.

5. A flash system according to claim 1, wherein said source of flash illumination comprises a single flash light beam source and controlled means for separating the output of said single source into separate direct and indirect flash light beams.

6. A method of providing artificial illumination for image capture wherein light from a source of flash illumination is selectively projected in a first direction toward an indirect reflecting surface located in spaced relation to a subject to illuminate the subject indirectly and in a second direction to illuminate the subject directly, said method comprising the steps of:

a) sensing directly electromagnetic radiation reflected directly from the indirect reflecting surface and not directly from the subject to provide a signal containing information about the indirect reflecting surface; and b) utilizing the information contained in said signal to control the selective projection of the light in said first and second directions to control the quantities of indirect and direct light which illuminate the subject.

7. A flash system for providing artificial illumination for image capture comprising:

a) a source of flash illumination which operates selectively in a first mode for projecting light in a first direction toward an indirect reflecting surface located in spaced relation to a subject to illuminate the subject indirectly and in a second mode for projecting light in a second direction to illuminate the subject directly;

b) means separate from said source for transmitting electromagnetic radiation in a third direction to the indirect reflecting surface in a manner such that a portion of the radiation is reflected from said surface;

c) detecting means for receiving said radiation reflected from the surface and providing a signal containing information relating to the distance between the surface and a given location; and d) control means operatively connected to said source of flash illumination and to said detecting means for causing operation of said source in both said first and second modes when the indirect reflecting surface is within a predetermined distance of said given location and for causing operation of said source only in said second mode when said surface is not within said predetermined distance.

8. A flash system according to claim 7, wherein said transmitting means and said detecting means comprises an infrared emitter-detector combination and wherein said control means comprises distance finder means operatively connected to said combination for providing a signal indicative of the distance between said combination and the indirect reflecting surface.

9. A flash system according to claim 7 in combination with a camera, further including means for varying camera aperture selection as a function of the selective operation of said source of flash illumination in said first and second modes.

10. A flash system according to claim 7 in combination with a camera, wherein said camera includes autoranging and flashmatic exposure control systems and wherein said apparatus further includes:

a) means for selecting camera aperture based on a default flashmatic program utilizing subject distance information when said source of flash illumination is operated only in said second mode; and b) means for causing the flashmatic programs to increase camera lens opening when said source of flash illumination is operated in both said first and second modes.

11. A flash system according to claim 7 in combination with a camera, wherein said camera includes autoranging and flashmatic exposure control systems and wherein said apparatus further includes:

a) means utilizing subject distance information to determine a direct flash f number when said information about said indirect reflecting surface indicates the absence of such surface; and b) means utilizing subject distance information to determine an indirect flash f number when said information about said indirect reflecting surface indicates the presence of such surfaces.

12. A flash system according to claim 7 in combination with a camera, wherein said camera includes autoranging and flashmatic exposure control systems and wherein said apparatus further includes:
   a) means utilizing subject distance information to determine the output of said source in said second mode when said information about said indirect reflecting surface indicates the absence of such surface; and
   b) means utilizing subject distance information to determine the output of said source in said first and second modes when said information about said indirect reflecting surface indicates the presence of such surface.

13. A flash system according to claim 7 in combination with a camera, further including:
   a) means for selecting a rapid recycle mode wherein said source of flash illumination operates only in said second mode; and
   b) means operatively associated with said selecting means for utilizing subject distance information to determine a rapid recycle f number.

14. A method of providing artificial illumination for image capture wherein light from a source of flash illumination is selectively projected in a first direction toward an indirect reflecting surface located in spaced relation to a subject to illuminate the subject indirectly and in a second direction to illuminate the subject directly, said method comprising the steps of:
   a) transmitting electromagnetic radiation in a third direction to the indirect reflecting surface in a manner such that a portion of the radiation is reflected from the surface;
   b) detecting said radiation reflected from the indirect reflecting surface to provide a signal containing information relating to the distance between the surface and a given location; and
   c) utilizing the information contained in said signal to cause projection of light in both said first and second directions when the indirect reflecting surface is within a predetermined distance of said given location and to cause projection of light only in said second direction when the indirect reflecting surface is not within said predetermined distance.

15. A flash system for providing artificial illumination for image capture comprising:
   a) a source of flash illumination which operates selectively in a first mode for projecting light in a first direction toward an indirect reflecting surface located in spaced relation to a subject to illuminate the subject indirectly and in a second mode for projecting light in a second direction to illuminate the subject directly;
   b) sensing means located to receive light reflected from the indirect reflecting surface directly to said sensing means during operation of said source in said first mode for providing a signal indicating the presence of the indirect reflecting surface, said sensing means comprising photodetector means disposed to receive light reflected from the indirect reflecting surface directly back to the photodetector means; and
   c) control means operatively connected to said source of flash illumination and to said sensing means for continuing operation of said source in said first mode when said signal is received within a predetermined time then causing operation of said source in said second mode and for terminating operation of said source from said first mode and operating said source in said second mode if said signal is not received within the predetermined time, said control means comprising means for comparing the output of said photodetector means to a threshold value and circuit means for providing control signals indicative of whether or not the output of said photodetector means exceeds said threshold value within said predetermined time.

16. A flash system according to claim 15 in combination with a camera, further including means for varying camera aperture selection as a function of the selective operation of said source of flash illumination in said first and second modes.

17. A flash system according to claim 15 in combination with a camera, wherein said camera includes autoranging and flashmatic exposure control systems and wherein said apparatus further includes:
   a) means for selecting camera aperture based on a default flashmatic program utilizing subject distance information when said source of flash illumination is operated only in said second mode; and
   b) means for causing the flashmatic programs to increase camera lens opening when said source of flash illumination is operated in both said first and second modes.

18. A flash system according to claim 15 in combination with a camera, wherein said camera includes autoranging and flashmatic exposure control systems and wherein said apparatus further includes:
   a) means utilizing subject distance information to determine a direct flash f number when said information about said indirect reflecting surface indicates the absence of such surface; and
   b) means utilizing subject distance information to determine an indirect flash f number when said information about said indirect reflecting surface indicates the presence of such surface.

19. A flash system according to claim 15 in combination with a camera, wherein said camera includes autoranging and flashmatic exposure control systems and wherein said apparatus further includes:
   a) means utilizing subject distance information to determine the output of said source in said second mode when said information about said indirect reflecting surface indicates the absence of such surface; and
   b) means utilizing subject distance information to determine the output of said source in said first and second modes when said information about said indirect reflecting surface indicates the presence of such surface.

20. A flash system according to claim 15 in combination with a camera, further including:
   a) means for selecting a rapid recycle mode wherein said source of flash illumination operates only in said second mode; and
   b) means operatively associated with said selecting means for utilizing subject distance information to determine a rapid recycle f number.

21. A method of providing artificial illumination for image capture wherein light from a source of flash illumination is selectively projected in a first direction toward an indirect reflecting surface located in spaced relation to a subject to illuminate the subject indirectly and in a second direction to illuminate the subject directly, said method comprising the steps of:
  a) receiving light reflected directly from the indirect reflecting surface and not directly from the subject during operation of the source in the first mode to provide a signal indicating the presence of the indirect reflecting surface;
  b) continuing operation of the source in the first mode when the signal is received within a predetermined time then causing operation of the source in the second mode; and
  c) terminating operation of the source from the first mode and operating said source in a second mode if the signal is not received within the predetermined time.

22. A flash system for providing artificial illumination in combination with a camera and comprising:
  a) a source of flash illumination which operates selectively in a first mode for projecting light in a first direction toward an indirect reflecting surface located in spaced relation to a subject to illuminate the subject indirectly and in a second mode for projecting light in a second direction to illuminate the subject directly;
  b) sensing means utilizing electromagnetic radiation reflected from the indirect reflecting surface for providing a signal containing information about the indirect reflecting surface, said sensing means being positioned to receive electromagnetic radiation reflected directly to said sensing means from the indirect reflecting surface, and not directly from the subject;
  c) control means operatively connected to said source of flash illumination and to said sensing means for controlling the selective operation of said source in said first and second modes as determined by the information in said signal from said sensing means; and
  d) means for varying camera aperture selection as a function of the selective operation of said source of flash illumination in said first and second modes.

23. A flash system for providing artificial illumination in combination with a camera including auto-ranging and flashmatic exposure control systems and comprising:
  a) a source of flash illumination which operates selectively in a first mode for projecting light in a first direction toward an indirect reflecting surface located in spaced relation to a subject to illuminate the subject indirectly and in a second mode for projecting light in a second direction to illuminate the subject directly;
  b) sensing means utilizing electromagnetic radiation reflected from the indirect reflecting surface for providing a signal containing information about the indirect reflecting surface, and said sensing means being positioned to receive electromagnetic radiation reflected directly to said sensing means from the indirect reflecting surface and not directly from the subject; and
  c) control means operatively connected to said source of flash illumination and to said sensing means for controlling the selective operation of said source in said first and second modes as determined by the information in said signal from said sensing means.

24. Apparatus according to claim 23 further including:
  a) means for selecting camera aperture based on a deflaut flashmatic program utilizing subject distance information when said source of flash illumination is operated only in said second mode; and
  b) means for causing the flashmatic programs to increase camera lens opening when said source of flash illumination is operated in both said first and second modes.

25. Apparatus according to claim 23 further including:
  a) means utilizing subject distance information to determine a direct flash f number when said information about said indirect reflecting surface indicates the absence of such surface; and
  b) means utilizing subject distance information to determine an indirect flash f number when said information about said indirect reflecting surface indicates the presence of such surfaces.

26. Apparatus according to claim 23 further including:
  a) means utilizing subject distance information to determine the output of said source in said second mode when said information about said indirect reflecting surface indicates the absence of such surface; and
  b) means utilizing subject distance information to determine the output of said source in said first and second modes when said information about said indirect reflecting surface indicates the presence of such surface.

27. A flash system for providing artificial illumination in combination with a camera and comprising;
  a) a source of flash illumination which operates selectively in a first direction toward an indirect reflecting surface located in spaced relation to a subject to illuminate the subject indirectly and in a second mode for projecting light in a second direction to illuminate the subject directly;
  b) sensing means utilizing electromagnetic radiation reflected from the indirect reflecting surface for providing a signal containing information about the indirect reflecting surface, said sensing means being positioned to receive electromagnetic radiation reflected directly to said sensing means from the indirect reflecting surface and not directly from the subject;
  c) control means operatively connected to said source of flash illumination and to said sensing means for controlling the selective operation of said source in said first and second modes as determined by the information in said signal from said sensing means;
  d) means for selecting a rapid recycle mode wherein said source of flash illumination operates only in said second mode; and
  e) means operatively associated with said selecting means for utilizing subject distance information to determine a rapid recycle f number.

28. A flash system for providing artificial illumination for image capture in combination with a camera, said flash system comprising:
  a) a source of flash illumination which operates selectively in the first mode for projecting light in a first direction toward an indirect reflecting surface located in spaced relation to a subject to illuminate the subject indirectly and in a second mode for projecting light in a second direction to illuminate the subject directly;

b) sensing means utilizing electromagnetic radiation reflected from the indirect reflecting surface for providing a signal containing information about the indirect reflecting surface, said sensing means being positioned to receive electromagnetic radiation reflected directly from the indirect reflecting surface and not from the subject; and c) control means operatively connected to said source of flash illumination and to said sensing means for controlling the selective operation of said source in said first and second modes as determined by the information in said signal from said sensing means.

29. A flash system for providing artificial illumination for image capture in combination with a camera, said flash system comprising:

a) a source of flash illumination which operates selectively in a first mode for projecting light in a first direction toward an indirect reflecting surface located in spaced relation to a subject to illuminate the subject indirectly and in a second mode for projecting light in a second direction to illuminate the subject directly;

b) means separate from said source for transmitting electromagnetic radiation in a third direction to the indirect reflecting surface in a manner such that a portion of the radiation is reflected from said surface;

c) detecting means for receiving said radiation reflected from the surface and providing a signal containing information relating to the distance between the surface and a given location; and d) control means operatively connected to said source of flash illumination and to said detecting means for causing operation of said source in both said first and second modes when the indirect reflecting surface is within a predetermined distance of said given location and for causing operation of said source only in said second mode when said surface is not within said predetermined distance.

30. A flash system for providing artificial illumination for image capture in combination with a camera, said flash system comprising:

a) a source of flash illumination which operates selectively in a first mode for projecting light in a first direction toward an indirect reflecting surface located in spaced relation to a subject to illuminate the subject indirectly and in a second mode for projecting light in a second direction to illuminate the subject directly;

b) sensing means located to receive light reflected from the indirect reflecting surface directly to said sensing means during operation of said source in said first mode for providing a signal indicating the presence of the indirect reflecting surface, said sensing means comprising photodetector means disposed to receive light reflected from the indirect reflecting surface directly back to the photodetector means; and c) control means operatively connected to said source of flash illumination and to said sensing means for continuing operation of said source in said first mode when said signal is received within a predetermined time then causing operation of said source in said second mode and for terminating operation of said source from said first mode and operating said source in said second mode if said signal is not received within the predetermined time, said control means comprising means for comparing the output of said photodetector means to a threshold value and circuit means for providing control signals indicative of whether or not the output of said photodetector means exceeds said threshold value within said predetermined time.

* * * * *